(12) United States Patent
Narbaiza Gomez

(10) Patent No.: US 7,780,199 B2
(45) Date of Patent: Aug. 24, 2010

(54) BICYCLE FRAME

(75) Inventor: Xabier Narbaiza Gomez, Nallabia (ES)

(73) Assignee: Orbea, S. Coop. Ltda., Mallabia (Bizcaia) (ES)

( * ) Notice: Subject to any disclaimer, the term of this patent is extended or adjusted under 35 U.S.C. 154(b) by 0 days.

(21) Appl. No.: 12/092,429

(22) PCT Filed: May 18, 2006

(86) PCT No.: PCT/ES2006/000260

§ 371 (c)(1),
(2), (4) Date: May 2, 2008

(87) PCT Pub. No.: WO2007/051871

PCT Pub. Date: May 10, 2007

(65) Prior Publication Data

US 2008/0231015 A1 Sep. 25, 2008

(30) Foreign Application Priority Data

Nov. 3, 2005 (ES) ................................ 200502674

(51) Int. Cl.
B62K 19/48 (2006.01)
B62D 25/18 (2006.01)
(52) U.S. Cl. ................. 280/848; 280/281.1; 280/847
(58) Field of Classification Search ............. 280/281.1, 280/847, 848
See application file for complete search history.

(56) References Cited

U.S. PATENT DOCUMENTS

| | | | | |
|---|---|---|---|---|
| 520,245 A * | 5/1894 | Rudy | ................. | 280/152.3 |
| 1,547,157 A * | 7/1925 | Neracher | ................. | 180/225 |
| 2,034,158 A * | 3/1936 | Stoffel | ................. | 280/92 |
| 2,251,005 A * | 7/1941 | Rubinich | ................. | 280/258 |
| 4,015,854 A | 4/1977 | Ramond | | |
| 4,941,674 A | 7/1990 | Trimble | | |
| RE33,295 E * | 8/1990 | Trimble | ................. | 280/281.1 |
| 5,255,932 A * | 10/1993 | Moore | ................. | 280/281.1 |
| D349,087 S * | 7/1994 | Rowley | ................. | D12/186 |
| 5,918,904 A * | 7/1999 | Hanesworth | ................. | 280/852 |
| 6,047,786 A * | 4/2000 | Stevenson et al. | ................. | 180/65.1 |
| 6,089,586 A * | 7/2000 | Rudell et al. | ................. | 280/282 |
| 6,644,693 B2 * | 11/2003 | Michisaka et al. | ................. | 280/835 |
| 7,360,619 B2 * | 4/2008 | Adachi et al. | ................. | 180/219 |
| 7,584,978 B2 * | 9/2009 | Pourias | ................. | 280/287 |
| 2006/0138743 A1 * | 6/2006 | Beal | ................. | 280/275 |
| 2008/0054594 A1 * | 3/2008 | Irizar | ................. | 280/281.1 |

FOREIGN PATENT DOCUMENTS

| | | | |
|---|---|---|---|
| DE | 19629740 A | | 1/1998 |
| EP | 1544092 A1 | * | 6/2005 |
| JP | 2003312565 A | * | 11/2003 |

* cited by examiner

Primary Examiner—Lesley Morris
Assistant Examiner—Daniel Yeagley
(74) Attorney, Agent, or Firm—Lucas & Mercanti, LLP

(57) ABSTRACT

Bicycle frame, of the type which consist of a diagonal tube (1) of quadrangular section, in which at least in the mid-upper zone (11) of the diagonal tube (1) which faces the bicycle wheel, the outer side (10) of said quadrangular section is concave, and the size (a) of said outer side (10) increases approximately from the upper section (A:A) to the central section (C:C) of the diagonal tube (1).

2 Claims, 3 Drawing Sheets

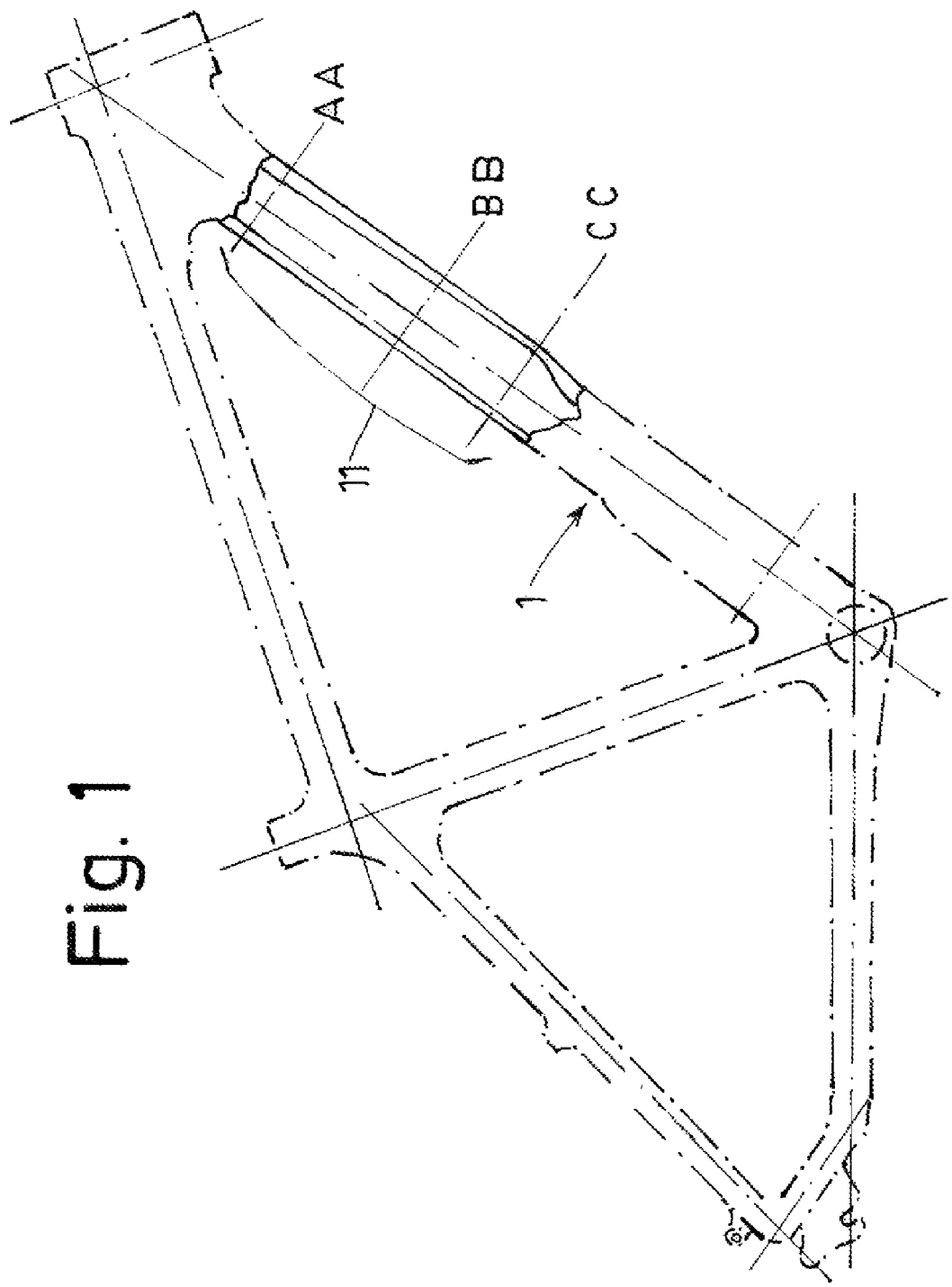

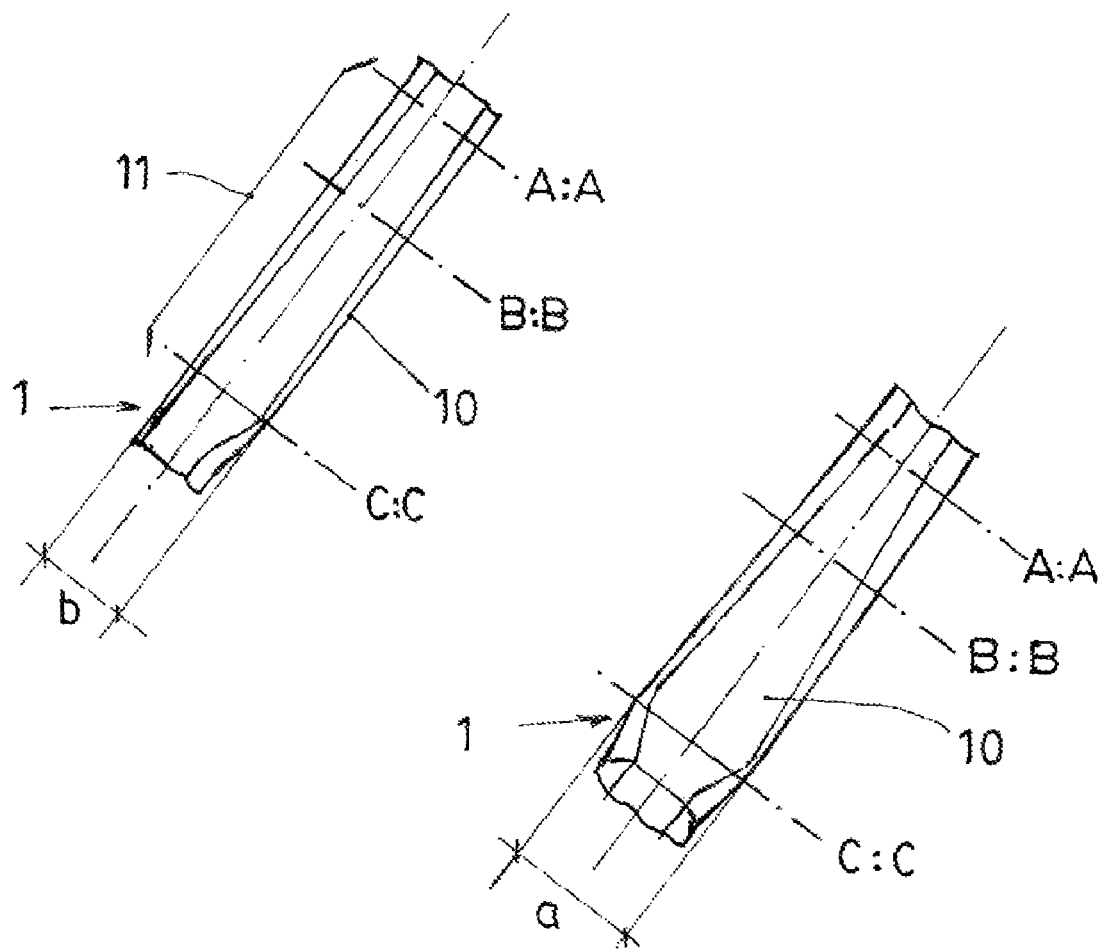

BICYCLE FRAME

BACKGROUND OF THE INVENTION

The new materials that are appearing and gaining great force in the bicycle sector (composite materials, thermostable fibres, new metal alloys, etc.) cause, in turn, the appearance of new bicycle frame manufacturing methods.

In this way, many new creative options are opening up for the designers and builders who can attain many objectives, until now beyond reach due to the limitations existing in the current state of the technique.

Throughout the history of the bicycle, one of the objectives of all manufacturers of high-performance models has been the optimization of the rigidity/weight ratio. That is, obtaining the maximum rigidity with the minimum weight.

The minimization of the weight is due to the need to reduce to the maximum the mass that the cyclist must ascend in positive elevation differences and facilitate accelerations, as the lower mass provides greater accelerations with the same applied Force. (F=m*a).

However, in seeking minimum weight, frequently the rigidity of the frame has been neglected. It is a basic property in ensuring the control and stability of the vehicle, but also for taking advantage of the cyclist's energy. That is, a frame which, due to insufficient rigidity, undergoes deformations under the application of the pedalling forces of the cyclist, supposes an inefficient use of the total applied energy. Said loss of energy is proportional to the deformation of the structure squared (Energy½*Rigidity structure*Deformation²).

It is, therefore, clear that for the optimization of the performance of a bicycle, not only must the weight be reduced, but the rigidity must also be maintained at high levels.

SUMMARY OF THE INVENTION

The diagonal tube plays a fundamental role in providing the bicycle frame with the necessary rigidity under lateral and torsional forces.

In this context, the bicycle frame which is the object of the invention is presented, in which the diagonal tube has a double effect. Its specific shapes/sections have a double purpose:

1.—To provide the frame with maximum performance, through an ultra-rigid structure, with main tubes (in which the diagonal tube is fundamental) with a great moment of inertia.

2.—Protecting the cyclist in adverse conditions of mud and loose soil, carrying out a "mudguard" task. In this way the diagonal tube prevents, to a great extent, the impact of many particles upon the cyclist, substituting the conventional mudguard with clear advantage.

Through numerous theoretical calculations and diverse studies, the applicant has irrefutably found that the mid-upper zone of the diagonal tube is the critical zone for rigidity; therefore, we must try to give it the greatest moment of inertia possible with respect to its generating function. The limit must be marked by a minimum safety thickness which ensures the integrity of the structure in the event of occasional impacts and also by a limitation of maximum weight.

The object of the invention is to solve the two problems mentioned:

maximum rigidity of the diagonal tube with a minimum weight protection of the user from splashing from the front wheel.

Specifically, the bicycle frame which is the object of the invention consists of a diagonal tube of quadrangular section, which is characterized by the following:

a) at least in the mid-upper zone of the diagonal tube which faces the bicycle wheel, the outer side of said quadrangular section is concave, and b) the size of said outer side increases approximately from the upper section to the central section of the diagonal tube.

In the invention there are also two ribs on the lower ends of the diagonal tube which are the result of theoretical calculations but are also of great help as the use of accessories, such as mudguards and protective plates anchored to the diagonal tube, is normal in adverse conditions such as water, mud, loose stones or a combination of said conditions. However, all of them normally involve complications in assembly and support as well as in protection.

The bicycle frame which is the object of this invention has the purpose of integrating, to a certain degree, the work done by these accessories in the frame itself. Taking advantage of the special method of manufacturing of the single-piece carbon fibre frames, the diagonal tube has been given sections which provide the protective effect of the small mudguards without affecting weight, functionality or assembly adversely.

BRIEF DESCRIPTION OF THE DRAWINGS

To better understand the object of this invention, a preferred way of practical application is illustrated in the drawings, subject to additional changes which will not fundamentally alter it.

FIG. 1 is a general schematic view in elevation of a bicycle frame in which the mid-upper zone (11) of the double-effect diagonal tube (1) where the invention is based, is highlighted.

FIG. 2 is a view in detail of FIG. 1.

FIG. 3 is a schematic view in profile, corresponding to FIG. 2.

DETAILED DESCRIPTION OF THE INVENTION

Described below is a practical, non-limiting application of this invention.

In a conventional bicycle frame the diagonal tube (1) is of constant section. Because of this, the section of the entire tube must be the greatest needed to cover the resistance/rigidity which is necessary to support in its critical zone, which is the mid-upper zone (11)—see FIGS. 1 and 2—.

Figure 4:
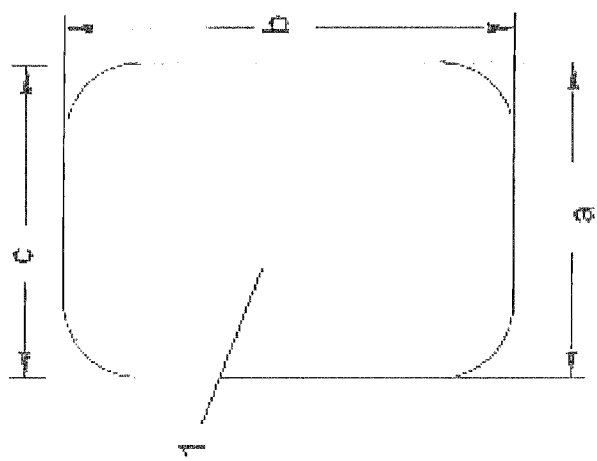
FIGS. 4, 5 and 6 represent sections of the diagonal tube (1) in its mid-upper zone (11) according to indications, respectively, A:A, B:B and C:C of FIGS. 1 and 2.
Figure 5:
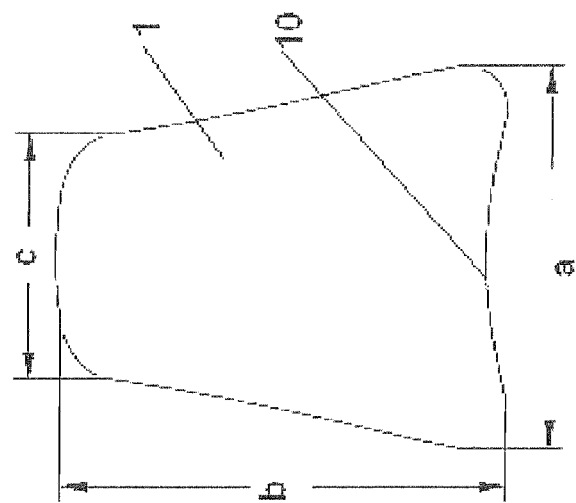
Figure 6:
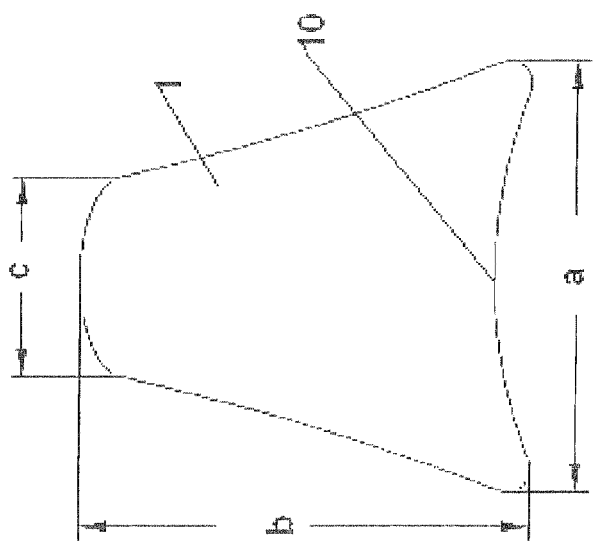

In the new preconized bicycle frame, the diagonal tube (1) in accordance with the object of the invention, has a variable section, different in its different parts of its mid-upper zone (11)—see FIGS. 4 to 6—.

The critical zone with regard to resistance/rigidity is the mid-upper zone (11). According to the bicycle frame which is the object of the invention, the diagonal tube (1) presents a variable section in this mid-upper zone (11), this being where the section offers a greater moment of inertia with respect to its generating function with the special features that the section is polygonal and presents, at least one of its sides (10) curved-concave—see FIGS. 5 and 6—and with the additional special feature that the diagonal tube (1) in this zone (11) has a width (a) greater than the width of the tyre of the front wheel of the bicycle—see FIGS. 5 and 6—, thus, this zone will be the one that offers greater protection, as the flow of particles not rejected by said tube (1) will have a trajectory in which they cannot collide with the head of the cyclist In the hypothetical case that the cyclist were to continue in a straight trajectory, all of the particles that would normally hit his face (most dangerous zone for the control of the vehicle), they will be stopped, precisely because of the specific configuration of the diagonal tube (1) in this zone.

The relation between frontal width (a) rear width (c) and thickness (b) of the diagonal tube (1) is variable in the different sections.

For the application illustrated—see FIGS. 4 to 6—, the different sections are of blunt vertexes and the thickness (b) is kept constant varying the rear width (c) between the lowest minimum value—see FIG. 6—in section C:C of this mid-upper zone (11) of the diagonal tube (1) to a maximum value c=a—see FIG. 4—in the highest section A:A of this mid-upper zone (11) of the diagonal tube (1).

The frontal width (a) is greater in the mid-upper zone (11) of the diagonal tube (1). Particularly in this zone (11) the width (a) is greater than the width of the tyre and its profile is curved-concave (10), the diagonal tube (1) acting as a mudguard.

The invention claimed is:

1. In a pedal bicycle frame having a rectilinear diagonal tube positioned extending between a pedal mount and a handlebar mount, the improvement comprising:
   the rectilinear diagonal tube having a quadrangular cross-section, the tube having mid-upper zone with a bottom wall that faces a front tire, the bottom wall, in cross-section, being concave and having a variable width that increases from an upper section of the mid-upper zone to a central section of the tube, and a top wall, in cross-section, having a variable width that decrease from the upper section of the mid-upper zone to a central section of the tube.

2. The bicycle frame, according to claim 1, wherein, at least the variable width of the bottom wall is greater than a width of the front tire.

* * * * *